United States Patent
Sharpe et al.

(10) Patent No.: US 7,797,505 B2
(45) Date of Patent: Sep. 14, 2010

(54) PROGRAM STACK HANDLING

(75) Inventors: Edward J. Sharpe, Los Gatos, CA (US); Lawrence D. K. B. Dwyer, So. San Francisco, CA (US); Steven M. Valentine, Santa Clara, CA (US); Eric W. Hamilton, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 525 days.

(21) Appl. No.: 11/113,461

(22) Filed: Apr. 25, 2005

(65) Prior Publication Data

US 2006/0242375 A1 Oct. 26, 2006

(51) Int. Cl.
*G06F 11/07* (2006.01)
(52) U.S. Cl. .......................... 711/170; 714/5
(58) Field of Classification Search ................ 711/170; 714/5
See application file for complete search history.

(56) References Cited

U.S. PATENT DOCUMENTS

| | | | | |
|---|---|---|---|---|
| 3,924,245 | A * | 12/1975 | Eaton et al. | 711/219 |
| 5,566,321 | A * | 10/1996 | Pase et al. | 711/153 |
| 5,611,043 | A | 3/1997 | Even et al. | |
| 5,659,701 | A | 8/1997 | Amit et al. | |
| 5,950,221 | A | 9/1999 | Draves et al. | |
| 5,978,892 | A * | 11/1999 | Noel et al. | 711/170 |
| 6,125,430 | A * | 9/2000 | Noel et al. | 711/152 |
| 6,502,183 | B2 * | 12/2002 | Vlot et al. | 712/202 |
| 6,526,463 | B1 | 2/2003 | Ding et al. | |
| 6,557,093 | B2 * | 4/2003 | Vlot et al. | 712/202 |
| 6,629,228 | B1 * | 9/2003 | Farago et al. | 711/170 |
| 6,643,662 | B1 * | 11/2003 | Farago et al. | 1/1 |
| 6,795,910 | B1 * | 9/2004 | Tormey et al. | 712/202 |
| 6,934,825 | B1 * | 8/2005 | Farago et al. | 711/170 |
| 7,000,071 | B2 * | 2/2006 | Ciesinger et al. | 711/115 |
| 7,124,251 | B2 * | 10/2006 | Clark et al. | 711/132 |
| 7,380,245 | B1 * | 5/2008 | Lovette | 718/100 |
| 2004/0034742 | A1 * | 2/2004 | Field et al. | 711/132 |
| 2005/0086658 | A1 * | 4/2005 | Wilding et al. | 718/104 |
| 2005/0198464 | A1 * | 9/2005 | Sokolov | 711/203 |
| 2008/0016305 | A1 * | 1/2008 | Chen et al. | 711/163 |

OTHER PUBLICATIONS

Aleph One. Smashing the Stack for Fun and Profit. Phrack, 7(49). Nov. 1996. Archive.org date of Jul. 5, 2002. http://www.cs.wright.edu/~tkprasad/courses/cs781/alephOne.html.*
P. Wagle and C. Cowan. StackGuard: Simple Stack Smash Protection for GCC. 2003. Proceedings of the GCC Developers Summit. pp. 243-256.*
Baratloo, A., Singh, N., and Tsai, T. 2000. Transparent run-time defense against stack smashing attacks. In Proceedings of the Annual Conference on USENIX Annual Technical Conference (San Diego, California, Jun. 18-23, 2000). USENIX Annual Technical Conference. USENIX Association, Berkeley, CA, 21-21.*
Cowen, C., Wagle, P., Pu, C., Beattie, S., Walpole, J. Buffer overflows: attacks and defenses for the vulnerability of the decade. 2003. Foundations of Intrusion Tolerant Systems. pp. 227-237.*

* cited by examiner

*Primary Examiner*—Sanjiv Shah
*Assistant Examiner*—Samuel Dillon

(57) ABSTRACT

Systems, methods, and device are provided for program stack handling. One method embodiment includes recognizing that a fault has occurred because a particular address range in a memory stack has been accessed. The method includes evaluating a current utilized size of regions in the memory stack. A particular address range between the current utilized size of regions in the memory stack is then relocated.

12 Claims, 5 Drawing Sheets

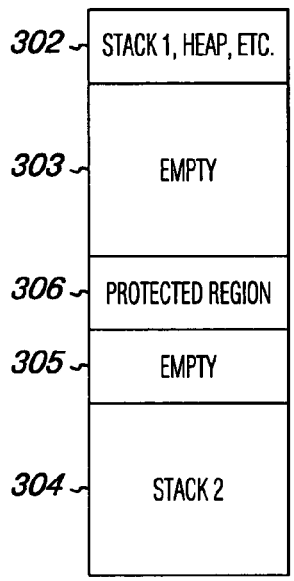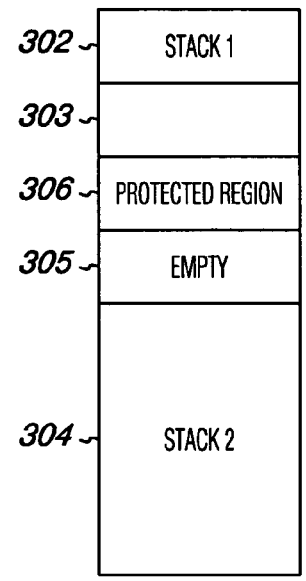
*Fig. 3A*  *Fig. 3B*
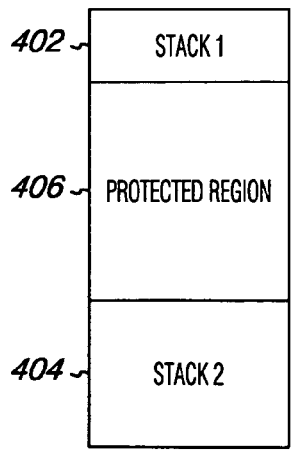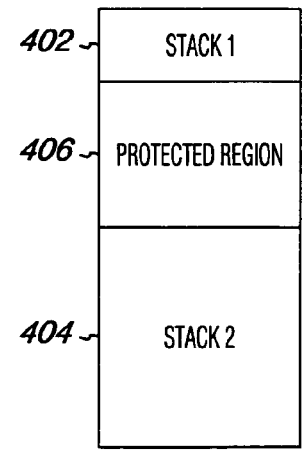
*Fig. 4A*  *Fig. 4B*

PROGRAM STACK HANDLING

BACKGROUND

Before a computing device may accomplish a desired task, it must receive an appropriate set of instructions. Executed by a device's processor(s), these instructions direct the operation of the device. These instructions can be stored in a memory of the computer. Instructions can invoke other instructions.

A computing device, such as a server, router, desktop computer, laptop, etc., and other devices having processor logic and memory, includes an operating system layer and an application layer to enable the device to perform various functions or roles. The operating system layer includes a "kernel", i.e., master control program, that runs the computing device. The kernel provides task management, device management, and data management, among others. The kernel sets the standards for application programs that run on the computing device and controls resources used by application programs. The application layer includes programs, i.e., executable instructions, which are located above the operating system layer and accessible by a user. As used herein, "user space", "user-mode", or "application space" implies a layer of code which is less privileged and more directly accessible by users than the layer of code which is in the operating system layer or "kernel" space.

When the execution of the program instructions call for data or other program instructions, the program will want to know where in memory the data or instructions are stored. In effect, the program will use a means for referencing or indexing where in memory the data or instructions are held. The kernel is responsible for virtual memory management. With virtual memory, a process is assigned its own virtual address space, which may not be available to other processes. In virtual memory a process has a logical view of memory that does not correspond to the actual layout of physical memory. When a process uses a virtual memory address the virtual memory system translates it into a physical address using a virtual to physical address mapping contained in some type of look up structure and address mapping database. Virtual memory is a technique within the memory management subsystem to allow the processor to access a larger memory space than the actual physical memory that exists in the processor system of a computing device. With many programs running on a computing device available physical memory space would quickly become an issue if all of the programs were to be assigned a physical memory address.

In an operating system, a process refers to a running program with input, output, and a state. For example, a process includes the current values of the program counter, the registers, and the variables of an executing program. Each process has an "address space". Further each process includes one or more threads associated with the "address space". The thread is sometimes referred to as a lightweight process. Processes and threads are well known in the art and are described, for example, in Modern Operating Systems, Andrew S. Tannenbaum, (1992). Hence, running a process generally requires executing a thread and accessing the address space.

A memory stack is a region of reserved memory in which programs store status data such as procedure and function call return addresses, passed parameters, local variables, and program instructions, i.e., program stacks. In certain processor architectures fixed regions of memory are protected and fully allocated to a process rather than a fixed region received and various portions allocated over time. Additionally, some processor architectures consist of two distinct program stacks per process execution context. Certain programming environments, however, export the notion of a single program stack. As a result, an operating system may have to allocate the two distinct program stacks within a single memory allocation provided by an application. The two stacks may be based at opposite ends of the allocation and grow towards each other as the application makes nested function or procedure calls. In the instance where two stacks collide, memory corruption and/or indeterminate program behavior may occur. If a guard page is used in a fixed manner, one stack may run into the guard page long before the other stack and waste memory space and/or abort a program prematurely.

BRIEF DESCRIPTION OF THE DRAWINGS

FIGS. 3A-3B illustrate an embodiment for dynamically moving a particular address range in handling a program stack.

FIGS. 4A-4B illustrate another embodiment for dynamically accommodating a program stack.

DETAILED DESCRIPTION

Program instructions are provided which execute to recognize that a fault has occurred because a certain region in a memory stack has been accessed. The instructions can execute to evaluate a current utilized size of regions in the memory stack. The program instructions can also execute to dynamically relocate the certain region between the current utilized sizes of regions in the memory stack without increasing the size of the memory stack.

Figure 1:
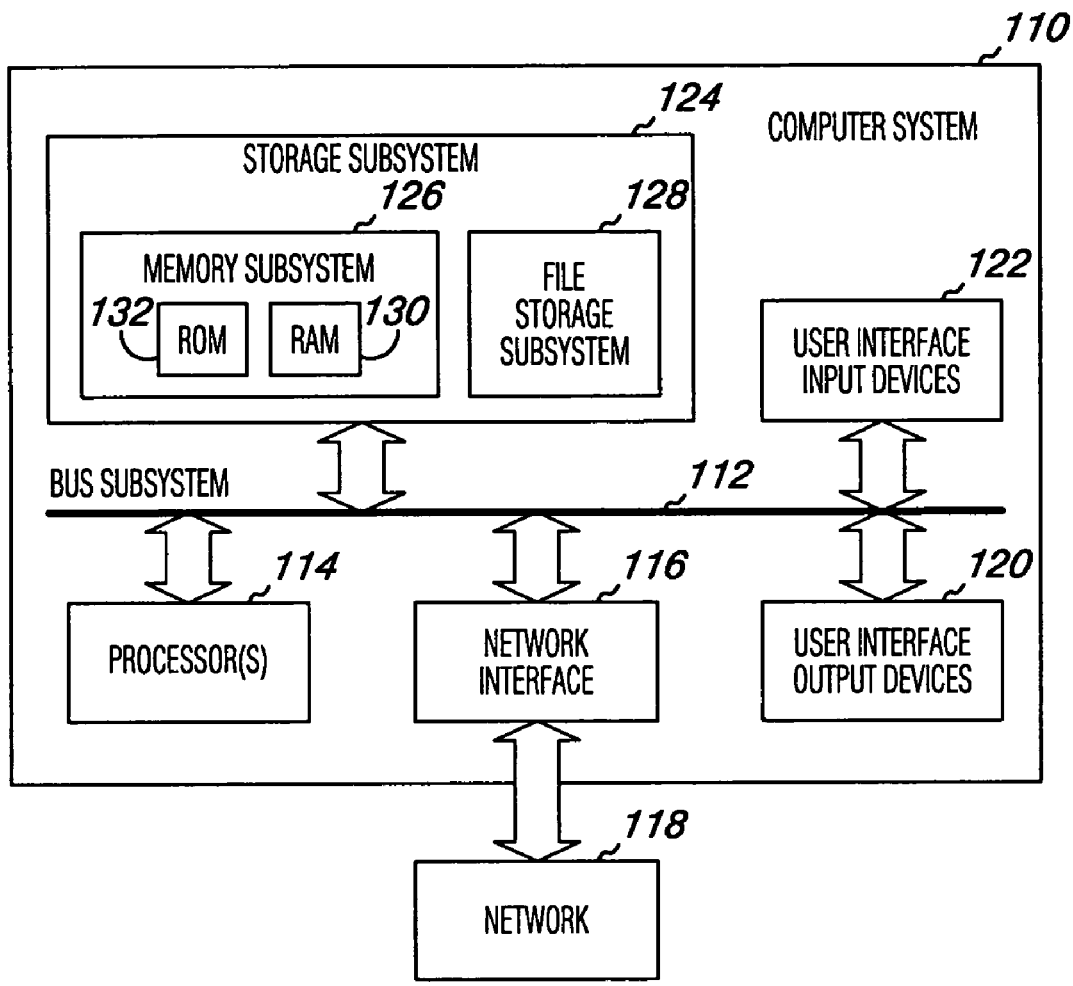
FIG. 1 is a block diagram of a computer system suitable to implement embodiments of the invention.

FIG. 1 is a block diagram of a computer system 110 suitable to implement embodiments of the invention. Computer system 110 includes at least one processor 114 which communicates with a number of other computing components via bus subsystem 112. These other computing components may include a storage subsystem 124 having a memory subsystem 126 and a file storage subsystem 128, user interface input devices 122, user interface output devices 120, and a network interface subsystem 116, to name a few. The input and output devices allow user interaction with computer system 110. Network interface subsystem 116 provides an interface to outside networks, including an interface to network 118 (e.g., a local area network (LAN), wide area network (WAN), Internet, and/or wireless network, among others), and is coupled via network 118 to corresponding interface devices in other computer systems. Network 118 may itself be comprised of many interconnected computer systems and communication links, as the same are known and understood by one of ordinary skill in the art. Communication links as used herein may be hardwire links, optical links, satellite or other wireless communications links, wave propagation links, or any other mechanisms for communication of information.

User interface input devices 122 may include a keyboard, pointing devices such as a mouse, trackball, touchpad, or graphics tablet, a scanner, a touchscreen incorporated into a display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non-visual displays such as audio output devices. The display subsystem may be a cathode ray tube (CRT), a flat-panel device such as a liquid crystal display (LCD) and/or plasma display, or a projection device (e.g., a digital light processing (DLP) device among others). The display subsystem may also provide non-visual display such as via audio output devices. In general, use of the term "output device" is intended to include all possible types of devices and ways to output information from computer system 110 to a user or to another machine or computer system 110.

Storage subsystem 124 can include the operating system "kernel" layer and an application layer to enable the device to perform various functions, tasks, or roles. File storage subsystem 128 can provide persistent (non-volatile) storage for additional program and data files, and may include a hard disk drive, a floppy disk drive along with associated removable media, a compact digital read only memory (CD-ROM) drive, an optical drive, or removable media cartridges. Memory subsystem 126 typically includes a number of memories including a main random access memory (RAM) 130 for storage of program instructions and data during program execution and a read only memory (ROM) 132 in which fixed instructions are stored. As used herein, a computer readable medium is intended to include the types of memory described above. Program embodiments as will be described further herein can be included with a computer readable medium and may also be provided using a carrier wave over a communications network such as the Internet, among others. Bus subsystem 112 provides a mechanism for letting the various components and subsystems of computer system 110 communicate with each other as intended.

Program embodiments according to the present invention can be stored in the memory subsystem 126, the file storage subsystem 128, and/or elsewhere in a distributed computing environment as the same will be known and understood by one of ordinary skill in the art. Due to the ever-changing nature of computers and networks, the description of computer system 110 depicted in FIG. 1 is intended only as one example of a computing environment suitable for implementing embodiments of the present invention. Many other configurations of computer system 110 are possible having more or less components than the computer system depicted in FIG. 1.

Figure 2A:
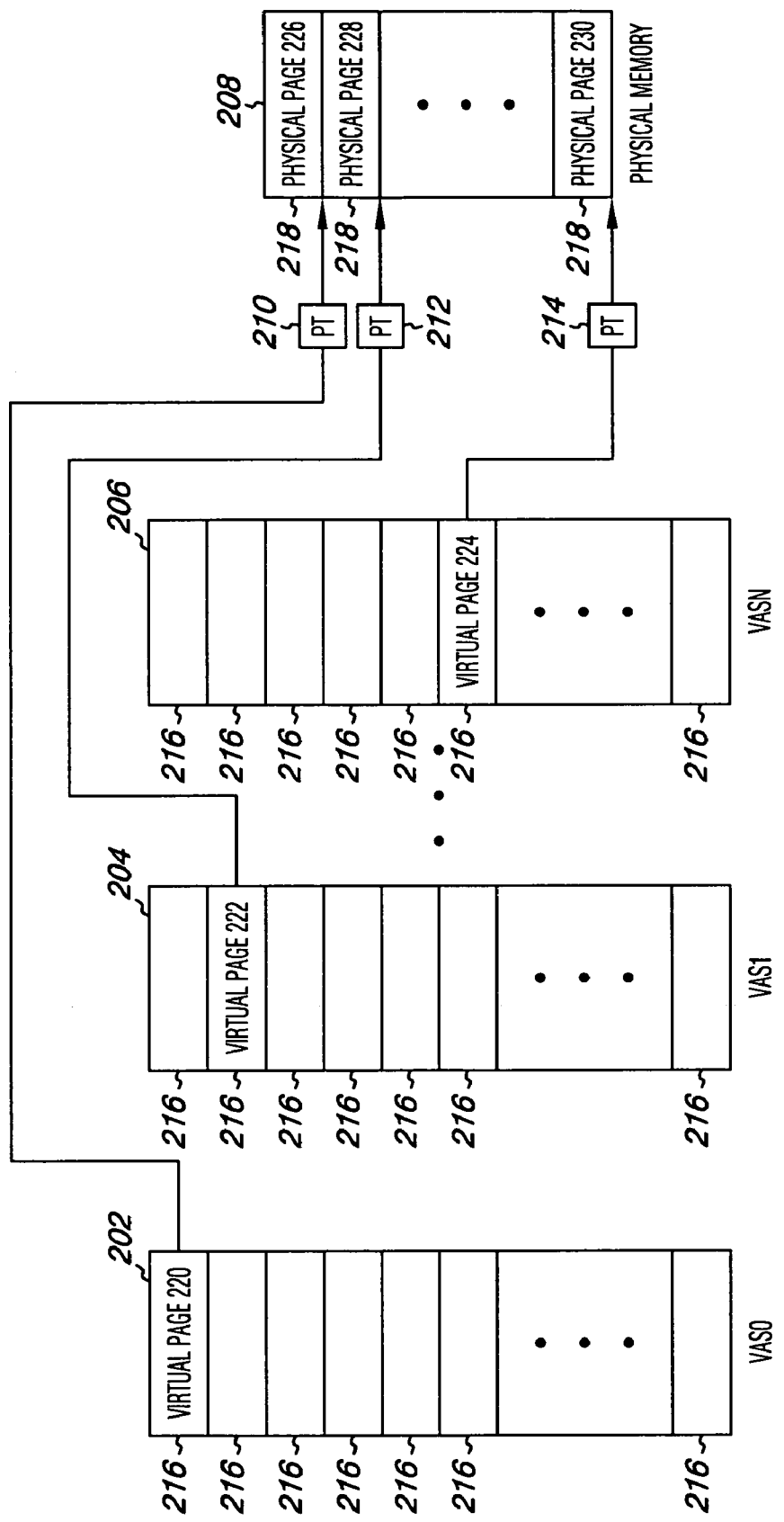
FIG. 2A illustrates an exemplary memory mapping method for mapping one or more virtual address spaces to a physical memory.

FIG. 2A illustrates an exemplary memory mapping method for mapping one or more virtual address spaces (or I/O spaces) to a physical memory. In FIG. 2A a number of virtual address spaces, e.g., 202 (VAS0), 204 (VAS1), and 206 (VASN) are shown. Each of the virtual address spaces 202, 204, and 206 can be provided with an associated page table for mapping virtual memory addresses to physical memory addresses as the same are known and understood by one of ordinary skill in the art. In the embodiment of FIG. 2A, the virtual address spaces 202, 204, and 206 are associated with page tables 210, 212, and 214, respectively. Each of the virtual address spaces has a plurality of virtual pages 216. A physical memory 208 also includes a plurality of physical pages 218. The virtual pages 216 and physical pages 218 are typically of same size and typically range from 4 kilobytes (KB) up to 16 KB. Embodiments, however, are not so limited and computer systems may employ any suitable page size, which can be selected by the operating system based on supporting hardware.

In this configuration, pages in the virtual address spaces 202, 204, and 206 are mapped to pages in the physical memory 208 via page tables 210, 212, and 214, respectively. For example, a virtual page 220 in the virtual address space 202 is mapped via page table 210 to physical page 226. Likewise, a virtual page 222 in the virtual address space 204 is mapped to physical page 228 through page table 212 while virtual page 224 of the virtual address space 206 is mapped to physical page 230 via page table 214. In those instances where a page is not present in the physical memory, a page fault is generated to load the page from a secondary storage device such as a hard drive, optical drive, tape drive, etc. Page mapping and page faults are well known in the art. It should be noted that page tables may be shared among several virtual address spaces. Indeed, even a portion of a page table may be shared among different address spaces.

Figure 2B:
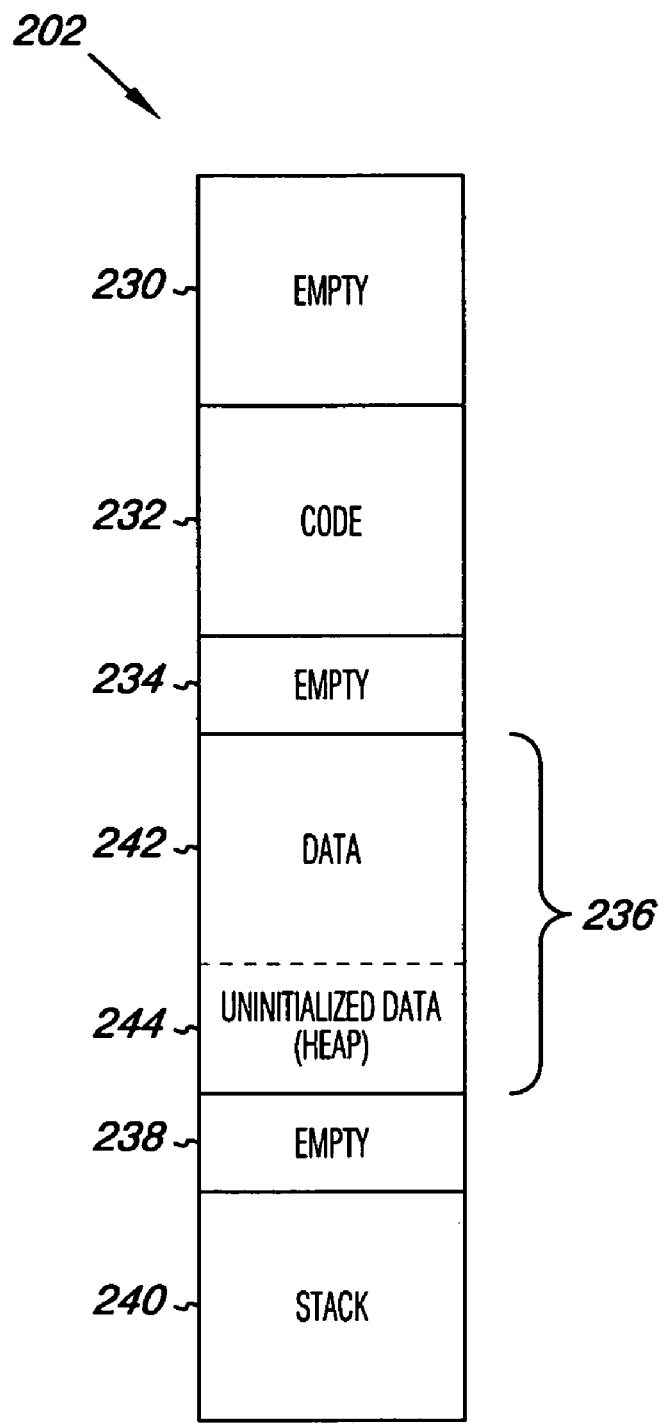
FIG. 2B illustrates a more detailed diagram of the exemplary virtual address space.

FIG. 2B illustrates a more detailed diagram of an exemplary virtual address space 202. A virtual address space, in abstract terms, is typically divided into a plurality of regions in accordance with data types. The virtual address space 202 is comprised of a plurality of regions 230, 232, 234, 236, 238, and 240. Each of the regions 230 through 240 is a contiguous region and the virtual pages within each region share common attributes. For example, the regions 230, 234, and 238 are empty regions that can be used to accommodate new data (e.g., files) from a secondary storage device or data from other contiguous regions 232, 236, and 240. The code region 232 corresponds to the address space of codes (e.g., text in Unix) such as programs, instructions, and the like. Data region 236 includes a pair of sub-regions 242 and 244 that corresponds to address spaces of data and uninitialized data (e.g., HEAP region), respectively. The program stack region 240 corresponds to the address space of a program stack. The operating system maintains attributes such as the start address and the length of each region so that each region can be tracked accurately.

As mentioned above, the virtual pages in each region share common attributes. For example, the code region 232 may have an attribute specifying a file on a hard drive from which instructions can be fetched. A program stack region 240 has an attribute that identifies it as a program stack and may grow dynamically and automatically toward lower and/or higher addresses. Other common attributes include read and write attributes. For instance, the code region 232 is generally given an attribute of read only while data is associated with both read and write attributes. Other attributes also may be applied to any of the regions in a virtual address space.

In modern computer systems, operating systems generally allow multiple threads to execute simultaneously in the virtual address space 202. For example, Unix and Linux operating systems allow multiple threads to concurrently execute in a single virtual address space. In such instances, the threads may be performing an operation that affects the address space at once. For example, multiple threads on multiple CPUs could simultaneously perform page faults.

In certain processor architectures fixed regions of memory are protected and fully allocated to a process rather than a fixed region reserved and various portions allocated over time. Additionally, some processor architectures consist of two distinct program stacks per process execution context. However, as mentioned above, certain programming environments export the notion of a single program stack. As a result, an operating system may have to provide two distinct program stacks within a single memory allocation provided by an application. The two program stacks may be based at opposite ends of the allocation and grow towards each other as the application makes nested function or procedure calls. Without a particular address range between the two program stacks, the two stacks may collide causing stack memory corruption and/or indeterminate behavior.

FIGS. 3A-3B illustrate an embodiment for dynamically moving a particular address range, e.g., special memory region or "protected region", in handling a program stack in a single memory allocation, e.g., fixed memory region 301. As shown in FIG. 3A, the memory region, or memory stack 301, is illustrated having a first address range 302, e.g., stack 1. For purposes of illustration, the first address range 302 will be discussed as a first program stack. However, as one of ordinary skill in the art will appreciate upon reading this disclosure the first address range can include a region of code, data (including unitialized HEAP data), etc. The memory stack 301 includes a second address range 304, illustrated as stack 2. As noted above, a program stack may grow as an application is executed. To keep the two address ranges, e.g., 302 and 304, separate a particular address range 306 can be defined. Empty regions, 303 and 305, are shown between the first address range 302 and the particular address range 306 as well as between the second address range 304 and the particular address range 306.

According to various embodiments, the first address range is provided for a first program stack 302 and the second address range is provided for a second program stack 304. The memory stack 301 can thus include two distinct program stacks, 302 and 304, per execution context. The first and the second program stacks, 302 and 304, can be provided at opposite ends of a single memory allocation 301. The first program stack 302 and the second program stack 304 may grow towards each other as the application makes nested function or procedure calls. In various embodiments the particular address range 306 is provided as a guard page 306 and can initially be placed in the middle of the single, fixed memory allocation 301. As used herein, a guard page 306 is a memory region that has hardware protections set such that an application cannot read and/or write to it. The guard page 306 causes a fault to be generated when accessed by the application. One of ordinary skill in the art will appreciate the manner in which a kernel based exception handler can generate a fault when a guard page is accessed. As the reader will appreciate, embodiments are not limited to use with guard pages. That is, as used herein, reference to the particular address range 306 can include any memory region 306 that causes a fault to the kernel.

According to various embodiments, the kernel's fault handling code is modified to recognize that a fault has occurred because a program stack guard page 306 has been accessed. In one embodiment, the kernel will then execute instructions to evaluate a current utilized size of regions, e.g., 302 and 304, in the memory stack 301. The kernel will then execute instructions to relocate the guard page 306 between the current utilized size of regions, e.g., 302 and 304, in the memory stack 301. FIG. 3A illustrates a second program stack 304, e.g., program stack 2, which is larger than a first program stack 302, e.g., program stack 1. As discussed more in connection with FIG. 5, the program instructions to evaluate and signal to relocate the guard page do not have to reside in the kernel but may instead be located in the application space.

FIG. 3B illustrates an embodiment where the second program stack 304, e.g., stack 2, utilization is high and has grown into an initial location of the guard page 306, as shown in FIG. 3A. According to embodiments, instructions execute to evaluate a current utilized size of the first and the second program stacks, 302 and 304. In the example embodiment of FIG. 3B, the first program stack has not grown as large as the second program stack 304. Thus, as shown in the embodiment, the instructions execute to relocate the guard page 306 between the current utilized size of regions, e.g., 302 and 304, in the memory stack 301. Accordingly, as illustrated in the embodiment of FIG. 3B, as one stack grows larger than the other, accessible memory space is increased for the larger stack. The instructions described herein offer an application transparent mechanism to allow full utilization of the memory stack 301 allocated by the application. By contrast, if the guard page 306 were fixed one stack may run into the guard page long before the other stack and potentially cause the application to abort prematurely, cause memory corruption, and/or indeterminate program behavior. In a fixed virtual address region the unused memory would not have been utilized. Another less desirable alternative to the instruction embodiments described herein would involve allocating far bigger program stack regions than are really necessary which again leads to memory waste in the form of excessive allocation of program address space and system swap space in fixed memory allocations.

FIGS. 4A-4B illustrate another embodiment for dynamically accommodating a program stack. FIG. 4A illustrates an example embodiment where again two distinct program stacks per execution context can be provided within a single memory allocation, or memory stack 401, provided by an application. FIG. 4A illustrates defining a portion of a memory stack 401 for a first program stack 402, e.g., stack 1, and defining another portion of the memory stack 401 for a second program stack 404, e.g., stack 2. The embodiment of FIG. 4A illustrates defining an entire region between the first and the second program stacks, 402 and 404, as a particular address range 406. In this embodiment, the memory stack 401 can start out with most of the memory stack 401 as guard pages 406 and having just a few pages at each end of the memory stack 401 for the two program stacks 402 and 404.

FIG. 4B illustrates that as the first and the second program stacks 402 and 404 grow, instructions, as described above, will execute to recognize that a fault has occurred because the particular address range 406 in the memory stack 401 has been accessed and execute to unprotect enough of the particular address range 406 to accommodate a current reference that caused the fault. In other words, as the stacks, 402 and 404, reach the guard area 406, instructions execute to decrease the guard area 406 on a relevant portion of the memory stack 411 where more usable stack space is needed.

The reader will appreciate that in this embodiment the entire memory stack 401 could initially be filled with guard pages 406 and the pages 406 unguarded as needed as faults are received and processed as described above. Effectively, program stack sizes would not have to be specified at all. Among various embodiments, a balance between the complexity associated with having applications specify program stack sizes and the delay associated with fault generation can be achieved by picking some initial amount, e.g., 1, 2, 3, 4, 16 kilobytes (KB), etc., of address space in the memory stack 401 to accommodate the first and the second program stacks, 402 and 404.

Figure 5:
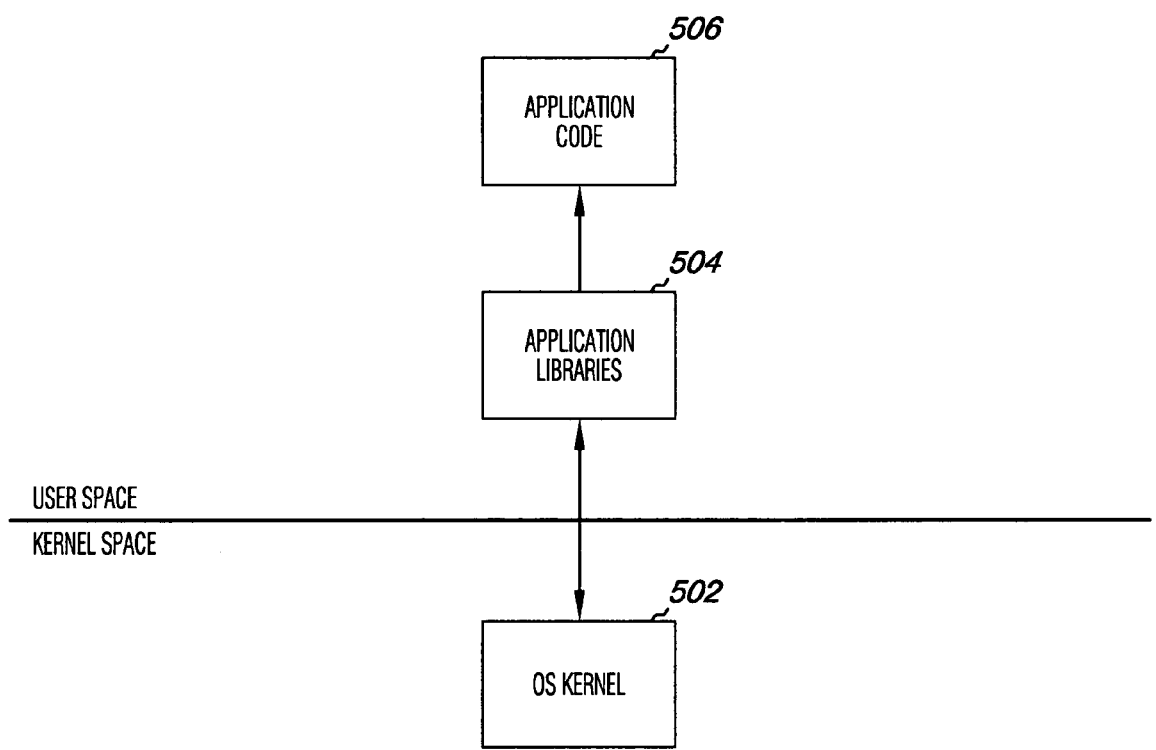
FIG. 5 illustrates an embodiment in which application space is involved in dynamically accommodating a program stack.

FIG. 5 illustrates an embodiment in which application space is involved in dynamically accommodating a program stack. According to any of the embodiments described, hardware can generate, e.g., raise, an exception when an application attempts to access an undefined and/or particular virtual address space, e.g., guard page. Such exceptions are passed to kernel based exception handlers as the same are appreciated by those of ordinary skill in the art. In the embodiment of FIG. 5, when such an event causes a fault to the kernel 502 instructions are executed to pass the fault signal up from the kernel space to the user, e.g., application space. As shown in this embodiment, application space system libraries 504 can be used to intercept the fault. That is, an application space system library will receive a fault signal from the kernel's fault handling code in kernel 502. The application space system library 504 can execute instructions to evaluate whether a particular address range, e.g., program stack guard page, should be adjusted. If so, the fault will be resolved and the application space system library 504 will execute instructions that signal back to the kernel's fault handling code, in the kernel 502, to relocate the program stack guard page. If not, the fault signal can be forwarded on to the application code 506. Embodiments are not limited to using an application space system library 504 to evaluate whether a particular address range should be adjusted and resolving and/or forwarding faults. That is, in various embodiments these actions can be handled by an application.

Embodiments have been described for dynamically moving a particular address range, e.g., to provide balancing of two or more program stacks, in a fixed virtual address region. As the reader will appreciate, embodiments described herein are limited to separate user and kernel spaces. That is, embodiments have been described in connection with kernel stacks. However, embodiments are additionally applicable for use in systems where there is no distinction between kernel and user space.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for handling a memory stack, comprising:
   providing a first address range in a memory stack for a first program stack;
   providing a second address range in the memory stack for a second program stack;
   providing a particular address range between the first address range and the second address range as a guard page for both the first program stack and the second program stack;
   recognizing that a fault has occurred because the particular address range in the memory stack has been accessed by either the first program stack or the second program stack;
   evaluating a currently utilized size of the first and the second program stacks; and
   relocating the particular address range to a new location between the first and the second program stacks;
   wherein the providing the particular address range includes providing a first empty region between the first address range and the particular address range, and a second empty region between the second address range and the particular address range.

2. The method of claim 1, wherein the first address range includes a heap region.

3. The method of claim 1, wherein relocating the particular address range includes relocating the particular address range between the first and the second program stacks with a third empty region between the first program stack and the particular address range, and a fourth empty region between the second program stack and the particular address range.

4. A computing device, comprising:
   a processor;
   a memory coupled to the processor; and
   program instructions provided to the memory and executable by the processor to:
   provide a first address range in a memory stack for a first program stack;
   provide a second address range in the memory stack for a second program stack;
   provide a particular address range between the first address range and the second address range with a first empty region between the first address range and the particular address range, and a second empty region between the second address range and the particular address range;
   generate a fault when the particular address range is accessed by either the first program stack or the second program stack;
   responsive to the fault, evaluate a current utilized size of each of the first and the second program stacks; and
   relocate the particular address range to a new location between the first and the second program stacks.

5. The computing device of claim 4, wherein the particular address range is a guard page.

6. The computing device of claim 4, wherein the second address range includes a heap region.

7. The computing device of claim 4, wherein the new location is closer to the first program stack, as compared to a corresponding location before the relocating, if the the particular address range is accessed by the second program stack.

8. The computing device of claim 4, wherein the new location is closer to the second program stack if particular address range is accessed by the first program stack.

9. A computing device, comprising:
   a processor;
   a memory coupled to the processor;
   means for:
   providing a first address range in a memory stack for a first program stack;
   providing a second address range in the memory stack for a second program stack;
   providing a particular address range between the first address range and the second address range as a guard page for both the first program stack and the second program stack;
   recognizing that a fault has occurred because the particular address range has been accessed by either the first program stack or the second program stack;
   evaluating a currently utilized size of the first and the second program stacks; and relocating the particular address range to a new location between the first and the second program stacks;

and means for providing a first empty region between the first address range and the particular address range, and a second empty region between the second address range and the particular address range when the particular address range is provided between the first address range and the second address range.

10. The computing device of claim 9, wherein the means for recognizing that the fault has occurred includes program instructions in a kernel's fault handling code that execute to recognize that the fault has occurred because a guard page in the particular address range has been accessed by at least one of the first and second program stacks.

11. The computing device of claim 10, wherein the means includes program instructions located in an application space to:

receive a fault signal from the kernel's fault handling code;

evaluate whether the guard page should be adjusted; and signal the kernel's fault handling code to relocate the guard page based on the evaluation.

12. The computing device of claim 9, including means for providing a third empty region between the first program stack and the relocated particular address range, and a fourth empty region between the second program stack and the relocated particular address range.

* * * * *

UNITED STATES PATENT AND TRADEMARK OFFICE
CERTIFICATE OF CORRECTION

| | | |
|---|---|---|
| PATENT NO. | : 7,797,505 B2 | Page 1 of 1 |
| APPLICATION NO. | : 11/113461 | |
| DATED | : September 14, 2010 | |
| INVENTOR(S) | : Edward J. Sharpe et al. | |

It is certified that error appears in the above-identified patent and that said Letters Patent is hereby corrected as shown below:

In column 8, line 46, in Claim 7, delete "the the" and insert -- the --, therefor.

In column 8, line 49, in Claim 8, delete "if particular" and insert -- if the particular --, therefor.

Signed and Sealed this
Thirty-first Day of May, 2011

David J. Kappos
*Director of the United States Patent and Trademark Office*